(12) United States Patent
Ishikawa

(10) Patent No.: US 9,740,088 B2
(45) Date of Patent: Aug. 22, 2017

(54) LIGHT SOURCE APPARATUS AND PROJECTION DISPLAY APPARATUS PROVIDED WITH SAME INCLUDING WAVEPLATE AND DICHROIC PRISM

(71) Applicant: NEC Display Solutions, Ltd., Tokyo (JP)

(72) Inventor: Takashi Ishikawa, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 14/787,737

(22) PCT Filed: Jun. 7, 2013

(86) PCT No.: PCT/JP2013/065844
§ 371 (c)(1),
(2) Date: Oct. 28, 2015

(87) PCT Pub. No.: WO2014/196079
PCT Pub. Date: Dec. 11, 2014

(65) Prior Publication Data
US 2016/0077417 A1    Mar. 17, 2016

(51) Int. Cl.
G03B 21/20        (2006.01)
G03B 33/08        (2006.01)
H04N 9/31         (2006.01)
G02B 26/00        (2006.01)
G02B 27/14        (2006.01)

(52) U.S. Cl.
CPC ......... *G03B 21/204* (2013.01); *G02B 26/008* (2013.01); *G02B 27/149* (2013.01);
(Continued)

(58) Field of Classification Search
CPC .. G02B 26/008; G03B 21/208; H04N 9/3114; H04N 9/3161
See application file for complete search history.

(56) References Cited

U.S. PATENT DOCUMENTS 8,000,019 B2 *   8/2011   Kato ................. G03B 21/28
                                                   353/33
8,911,092 B2 *  12/2014   Fujita ............... G03B 21/204
                                                   353/31
(Continued)

FOREIGN PATENT DOCUMENTS

JP    H06-265881 A     9/1994
JP    2004-341107 A   12/2004
(Continued)

OTHER PUBLICATIONS

International Search Report (ISR) (PCT Form PCT/ISA/210), in PCT/JP2013/065844, dated Aug. 6, 2013.

*Primary Examiner* — Bao-Luan Le
(74) *Attorney, Agent, or Firm* — McGinn IP Law Group, PLLC

(57) ABSTRACT

A light source apparatus includes: a phosphor wheel that is provided with a plurality of ring-shaped light-emitting regions that are arranged concentrically and that respectively generate illumination light beams of a plurality of colors when irradiated by excitation light; a light source unit that simultaneously radiates the excitation light to the ring-shaped light-emitting regions; and a plurality of optical elements that are irradiated by the plurality of illumination light beams that are generated due to the irradiation of the excitation light.

7 Claims, 9 Drawing Sheets

(52) U.S. Cl.
CPC ....... *G03B 21/208* (2013.01); *G03B 21/2013* (2013.01); *G03B 21/2073* (2013.01); *G03B 33/08* (2013.01); *H04N 9/3114* (2013.01); *H04N 9/3161* (2013.01)

(56) References Cited

U.S. PATENT DOCUMENTS

| | | | | |
|---|---|---|---|---|
| 9,185,372 | B2* | 11/2015 | Takahashi | H04N 9/3114 |
| 9,228,719 | B2* | 1/2016 | Wang | F21V 13/08 |
| 2006/0170873 | A1* | 8/2006 | Kato | G03B 21/28 353/34 |
| 2012/0133904 | A1* | 5/2012 | Akiyama | G02B 27/102 353/38 |
| 2013/0010264 | A1* | 1/2013 | Takahashi | H04N 9/3114 353/20 |
| 2013/0021582 | A1* | 1/2013 | Fujita | G03B 21/204 353/31 |
| 2013/0107226 | A1* | 5/2013 | Aksenov | H04N 9/315 353/31 |
| 2013/0321777 | A1* | 12/2013 | Wang | F21V 13/08 353/31 |

FOREIGN PATENT DOCUMENTS

| | | | |
|---|---|---|---|
| JP | 2010-237443 | A | 10/2010 |
| JP | 2012-113224 | A | 6/2012 |
| JP | 2012-142222 | A | 7/2012 |
| JP | 2012-185402 | A | 9/2012 |
| JP | 2012-247491 | A | 12/2012 |
| JP | 2013-047777 | A | 3/2013 |
| JP | 2013-076968 | A | 4/2013 |

* cited by examiner

LIGHT SOURCE APPARATUS AND PROJECTION DISPLAY APPARATUS PROVIDED WITH SAME INCLUDING WAVEPLATE AND DICHROIC PRISM

TECHNICAL FIELD

The present invention relates to a light source apparatus that is provided with a phosphor wheel that emits fluorescent light in response to excitation light from a light source and to a projection display apparatus that is provided with the light source apparatus.

BACKGROUND ART

Currently, various light source apparatuses have been proposed for use in projection display apparatuses such as liquid crystal projectors and DMD (Digital Micromirror Device) projectors.

For example, Patent Document 1 discloses a light source apparatus in which excitation light that is radiated from a light source excites a phosphor. More specifically, this light source apparatus is provided with: a light source that radiates blue excitation light that excites a phosphor, and a disk-shaped phosphor wheel to which a phosphor has been applied that radiates fluorescent light when irradiated by the excitation light. The phosphor wheel is divided in the circumferential direction into a red region that is composed of a phosphor that radiates light of the red wavelength when irradiated by excitation light, a green region that is composed of a phosphor that radiates light of the green wavelength, and a blue region that diffuses light of the blue wavelength. The phosphor wheel is provided with a rotation mechanism and radiates red, green, and blue light beams in time divisions by the irradiation of excitation light while the phosphors are being rotated. A condensing lens group that irradiates light beams that are emitted in time divisions in the phosphor wheel into the same light-guiding device is arranged between the phosphor wheel and the light-guiding apparatus (light tunnel) that both receives light from the phosphor wheel and emits the irradiated light that has been converted to light of a uniform intensity distribution. The light emitted from the light-guiding device is modulated by a DMD according to an image signal and then enlarged and projected onto a screen.

LITERATURE OF THE PRIOR ART

Patent Documents

Patent Document 1: Japanese Unexamined Patent Application Publication No. 2010-237443

SUMMARY OF THE INVENTION

Problem to be Solved by the Invention

Nevertheless, the light source apparatus of Patent Document 1 has the following problems.

In order to construct a high-luminance projection display apparatus using a light source apparatus that combines a laser light source and phosphor wheel, a method of decreasing etendue is considered in which the diameter of the laser light beam that is the excitation light that is irradiated upon a phosphor, i.e., the size of the spot of the excitation light, is decreased to decrease the light-emitting area of the phosphor. However, decreasing the size of the spot of the excitation light causes the laser power per unit area of the spot of the excitation light to increase. When the laser power per unit area of the spot of the excitation light increases, the quantum efficiency decreases due to the heat of the phosphor, whereby the light emission output of the phosphor decreases and luminance is reduced. In addition, a decrease of the quantum efficiency results in a further increase of the amount of generated heat of the phosphor itself, causing an even greater decrease in the luminance. In other words, increasing the laser power density on the phosphor gives rise to the phenomenon of temperature quenching. Decreasing etendue by decreasing the size of the spot of excitation light is therefore problematic.

It is an object of the present invention to provide a light source apparatus in which etendue is decreased and a projection display apparatus that is provided with this light source apparatus.

Means for Solving the Problem

The light source apparatus of the present invention includes a phosphor wheel provided with a plurality of ring-shaped light-emitting regions that are arranged concentrically and that emit illumination light of a plurality of colors due to the irradiation of excitation light; a light source unit that emits the excitation light simultaneously to the plurality of ring-shaped light-emitting regions; and a plurality of optical elements into which are irradiated a plurality of illumination light beams that are emitted by the irradiation of the excitation light.

BEST MODE FOR CARRYING OUT THE INVENTION

The light source apparatus of the present invention is next described with reference to the accompanying drawings.

First Exemplary Embodiment

Figure 1:
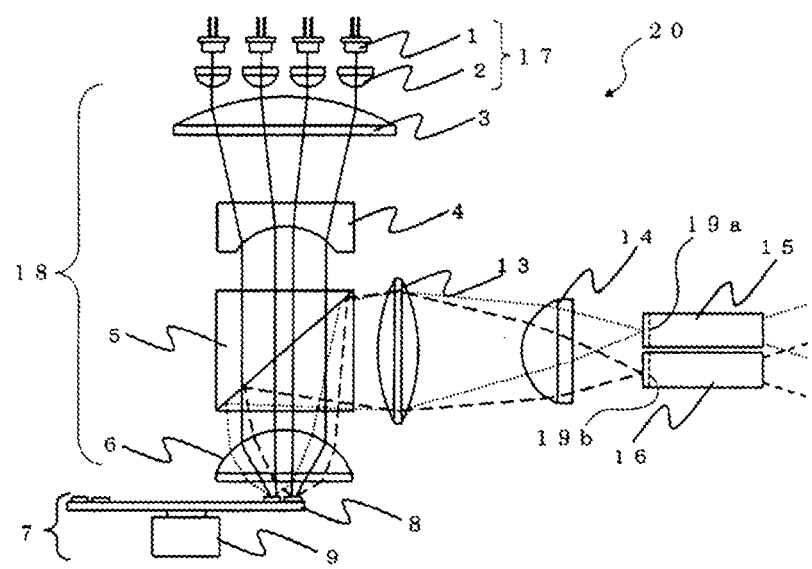
FIG. 1 is a schematic block diagram of the first exemplary embodiment of the light source apparatus according to the present invention.

FIG. 1 is a schematic block diagram of the first exemplary embodiment of the light source apparatus according to the present invention. Each part is described hereinbelow. Light source apparatus 20 of the present invention principally includes: light source unit 17, excitation optics 18, phosphor wheel 7, and optical elements 15 and 16. Examples of the optical elements include a hollow light tunnel and a solid rod integrator, but a light tunnel is taken as an example in the invention of the present application.

Light Source Unit

Light source unit 17 has light source 1 that emits excitation light of a first wavelength and collimator lens 2. No particular limitations apply to the type of light source 1, and for example, a laser diode that is a solid-state light source that emits light having a wavelength of approximately 405 nm (light of the first wavelength) can also be used.

When light source 1 is constituted by one laser diode, it is difficult to realize a high-luminance light source apparatus because there is an upper limit to the output of the laser diode. As a result, a plurality of laser diodes are arranged in array form to increase the output of the excitation light in the present exemplary embodiment.

The excitation light that is radiated from light sources 1 is a divergent beam. As a result, collimator lens 2 is arranged opposite to each of the laser diodes to convert the diffused beams to parallel beams. The excitation light that is irradiated into collimator lenses 2 from light sources 1 is converted to parallel beams, and irradiated into excitation optics 18.

Excitation Light Optics

Excitation optics 18 is next described. Excitation optics 18 is made up of convex lens 3, concave lens 4, dichroic prism 5, and lens 6; and produces a spot of excitation light on phosphor 7. Excitation optics 18 is not limited to these optical components. To realize an excitation light spot that has a suitable size, for example, a diffuser or other lens may be arranged before, after, or between the previously described optical components. Excitation optics 18 condenses the excitation light radiated from light source unit 17 on phosphor wheel 7 by means of the above-described optical components. The diameter of the spot of excitation light that is condensed and formed on phosphor wheel 7 is the same as in the related art such as Patent Document 1 and is realized such that the laser power per unit area of the spot of the excitation light does not become very large.

Phosphor Wheel

Figure 2:
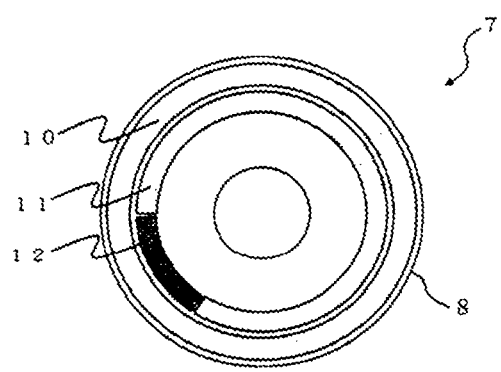
FIG. 2 is a view as seen from the side of irradiation of excitation light into a phosphor wheel.
Figure 3:
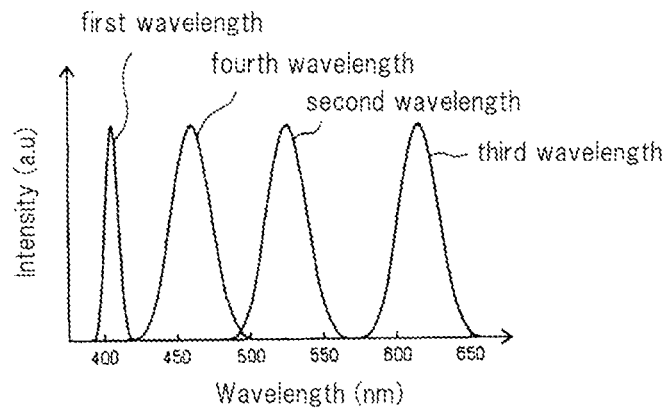
FIG. 3 is a graph showing the intensity of light from a first wavelength to a fourth wavelength.

Phosphor wheel 7 includes a disk-shaped substrate 8 and rotation motor 9. FIG. 2 shows phosphor wheel 7 when viewed from the side of incidence of the excitation light. FIG. 3 is a graph showing the intensity of light of the first wavelength to the light of the fourth wavelength. First phosphor region 10, second phosphor region 11, and third phosphor region 12 are provided on substrate 8.

First phosphor region 10 emits light of a second wavelength that is illumination light when light of the first wavelength that is the excitation light is irradiated, second phosphor region 11 emits light of a third wavelength that is illumination light when light of the first wavelength that is the excitation light is irradiated, and third phosphor region 12 emits light of a fourth wavelength that is illumination light when light of the first wavelength that is the excitation light is irradiated.

In the example shown in FIG. 2, phosphors are applied to substrate 8 in two bands that differ concentrically. In other words, two ring-shaped phosphors are formed on substrate 8. Of the two ring-shaped phosphors, the outer ring-shaped phosphor is phosphor region 10 that emits light of the second wavelength. The inner ring-shaped phosphor is divided in the circumferential direction between phosphor region 11 that emits light of the third wavelength and phosphor region 12 that emits light of the fourth wavelength. In the following explanation, of the two ring-shaped phosphor regions, the outer phosphor region will also be referred to as the "outer ring-shaped light-emitting region" and the inner phosphor region will also be referred to as the "inner ring-shaped light-emitting region." In the present exemplary embodiment, the second wavelength is green, the third wavelength is red, and the fourth wavelength is blue. In the following explanation, light emitted from a light-emitting region is also referred to as illumination light.

Light emitted from the phosphor wheel is irradiated into dichroic prism 5 after passing through lens 6.

The material of substrate 8 is not particularly limited, but substrate 8 is preferably a metal plate that has been subjected to a high-reflection process. The reason for this preference is that, for example, when a construction is adopted in which substrate 8 is a transparent substrate, a phosphor is applied onto the transparent substrate, and light is emitted from the surface that is opposite that of the incident surface of excitation light, it becomes difficult to extract all of the light radiated on the phosphor surface from the surface opposite the incident surface. In the present exemplary embodiment, although not shown in the figure, the metal substrate is subjected to a high-reflection process and phosphor is applied to this surface.

Substrate 8 is rotationally operated by rotational motor 9 such that the position of irradiation of excitation light changes among phosphor regions 10, 11, and 12. The position of irradiation of excitation light on substrate 8 changes circumferentially due to the rotational operation.

In the related art, the irradiation of a phosphor by excitation light caused the emission of light of the same wavelength from a region having the same amount of area as the spot of the excitation light. In the present invention, however, excitation light of the first wavelength is irradiated simultaneously onto the outer ring-shaped light-emitting region and the inner ring-shaped light-emitting region. As a result, illumination light is emitted in the outer ring-shaped light-emitting region and illumination light is also emitted in the inner ring-shaped light-emitting region by a single spot. In other words, the area of light emission in the outer ring-shaped light-emitting region and the area of light emission of the inner ring-shaped light-emitting region are each smaller than the area of light emission of the phosphor in the related art.

No special limitations apply to the shapes and light emission characteristics of phosphor regions 10, 11, and 12.

Dichroic Prism

Figure 4:
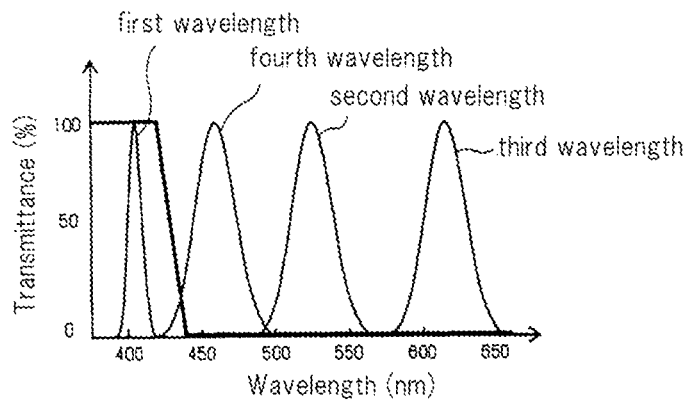
FIG. 4 is a graph showing the optical characteristics of a dichroic prism.

FIG. 4 is a graph showing the optical characteristics of dichroic prism 5. As shown in FIG. 4, in the present exemplary embodiment, dichroic prism 5 has the characteristics of transmitting light having a wavelength of 430 nm or less and reflecting light having a wavelength of 440 nm or greater. In other words, light of the first wavelength that is the excitation light passes through dichroic prism 5 and is condensed on phosphor wheel 7. Dichroic prism 5 reflects illumination light of the second to fourth wavelengths that is emitted from phosphor regions 10, 11, and 12 that are irradiated by the excitation light toward light tunnels 15 and 16. An optical component having this characteristic can be realized by a dielectric multilayered film technology. A dielectric multilayered film is an optical film for obtaining desired optical characteristics by layering several tens of layers by a technique that uses the interference of reflected light that is produced when a material having a low index of refraction and a material having a high index of refraction are stacked.

Light Tunnel

Field lens 13 and convex lens 14 guide illumination light of the second to fourth wavelengths that was reflected by dichroic prism 5 to the irradiation port of first light tunnel 15 or second light tunnel 16. Light tunnels 15 and 16 are components that convert irradiated light to light having a uniform light intensity distribution and emit the resulting light. As shown in FIG. 1, light tunnels 15 and 16 are arranged adjacent to each other. At this time, the irradiation ports of the light tunnels are arranged at positions having a conjugate relation with phosphor wheel 7. A conjugate relation indicates a relation of two points when light emitted from one point passes through an optical system and is then again condensed at one point. Accordingly, because the image of phosphor wheel 7 is formed at the positions of the irradiation ports of light tunnels 15 and 16, the images of the outer ring-shaped light-emitting region and inner ring-shaped light-emitting region are formed in a spatially divided state at the image formation positions when phosphor wheel 7 of the present exemplary embodiment is used. As a result, by disposing (arranging) the irradiation ports of first light tunnel 15 and second light tunnel 16 at respective positions of the image that results from the outer ring-shaped light-emitting region, i.e., phosphor region 10, and the images of the inner ring-shaped light-emitting region, i.e., phosphor regions 11 and 12, the same optical system can be used to spatially separate light of different wavelengths.

Accordingly, in the present exemplary embodiment, only green illumination light that is of the second wavelength is irradiated into first light tunnel 15, and red illumination light and blue illumination light that are of the third and fourth wavelengths are irradiated into second light tunnel 16 at time divisions according to the position of the spot of the excitation light.

As regards construction light tunnels 15 and 16, two light tunnels may be separately prepared and adjacently arranged or may be a single element that shares plates that face each other.

In addition, color filters 19a and 19b that selectively transmit light of a specific wavelength are preferably arranged in proximity to the irradiation ports or emission ports of each of light tunnels 15 and 16.

Figure 5A:
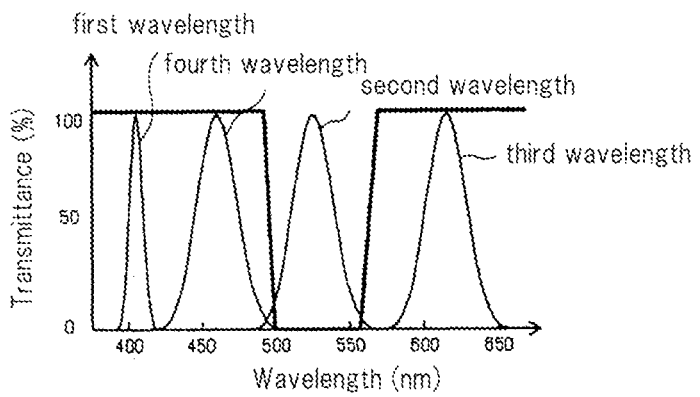
FIG. 5A is a graph showing the transmittance characteristics of a color filter that is arranged at the irradiation port or emission port of the first light tunnel.
Figure 5B:
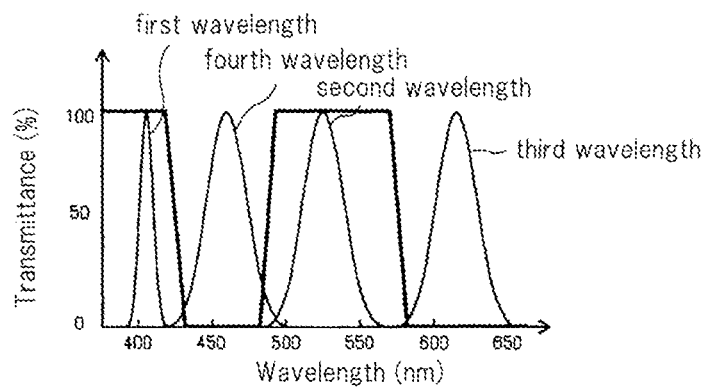
FIG. 5B is a graph showing the transmittance characteristics of a color filter that is arranged at the irradiation port or emission port of the second light tunnel.

FIG. 5A shows the transmittance characteristics of color filter 19a that is arranged at the irradiation port or emission port of first light tunnel 15. FIG. 5B shows the transmittance characteristics of color filter 19b that is arranged at the irradiation port or emission port of second light tunnel 16.

Color filter 19a that is arranged at first light tunnel 15 transmits light of the second wavelength (green) without transmitting light of the first wavelength in the vicinity of 405 nm that is excitation light and without transmitting light of the third wavelength (red) and fourth wavelength (blue).

Color filter 19b that is arranged at second light tunnel 16 transmits light of the third wavelength (red) and fourth wavelength (blue) without transmitting light of the first wavelength in the vicinity of 405 nm that is excitation light and without transmitting light of the second wavelength (green).

These color filters 19a and 19b can eliminate: of light of the first wavelength reflected on the phosphor surface, light that reaches light tunnels 15 and 16; and, of light that is emitted from the outer ring-shaped light-emitting region (phosphor region 10), light that is irradiated into second light tunnel 16 due to aberration of the optical system or, of light that is emitted from the inner ring-shaped light-emitting regions (phosphor regions 11 and 12), light that is irradiated into first light tunnel 15 due to aberration of the optical system. As a result, unnecessary wavelength components can be prevented from mixing with the illumination light that is emitted from light tunnels 15 and 16. In addition, because color filters 19a and 19b are not limited to the above-described optical characteristics, the transmittance characteristics are open to customization according to light of the desired wavelength.

Figure 6:
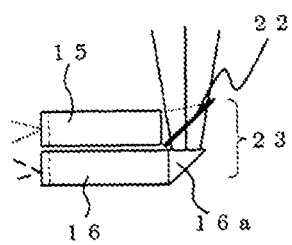
FIG. 6 is a schematic block diagram of the principal parts of a light source apparatus from which white light can be obtained.

An example of a configuration is next described that obtains white light from the illumination light that is emitted from light tunnels 15 and 16. FIG. 6 is a schematic block diagram of the vicinity of light tunnels 15 and 16. As shown in FIG. 6, synthesizing unit 23 is provided to synthesize light that is emitted from light tunnels 15 and 16. For example, synthesizing unit 74 is provided with refracting unit 16a such that the emission port of second light tunnel 16 deviates 90 degrees toward the direction of the emission port of first light tunnel 15 such that the emission ports of the two light tunnels 15 and 16 face each other at a right angle. Dichroic mirror 22 is then arranged in the vicinity of the emission port of first light tunnel 15 such that illumination light from first light tunnel 15 is reflected in the same direction as the emission direction of illumination light from the emission port of second light tunnel 16. At this time, the optical axes of the illumination light that is emitted from each of light tunnels 15 and 16 are caused to coincide. Dichroic mirror 22 is configured to reflect illumination light of the second wavelength and to transmit illumination light of the third and fourth wavelengths. A mirror may also be arranged in the proximity of the emission port of second light tunnel 16 without providing refracting unit 16a at second light tunnel 16 which would cause the optical axes of the illumination light emitted from each of light tunnels 15 and 16 to coincide by means of dichroic mirror 22 and the mirror.

By means of the above-described configuration, illumination light of the second wavelength that is emitted from first light tunnel 15 and illumination light of the third and fourth wavelengths that is emitted from second light tunnel 16 are synthesized on the same optical axis to thus enable white light to be obtained. Alternatively, a dichroic prism can be used in place of dichroic mirror 22.

As described hereinabove, in light source apparatus 20 of the present exemplary embodiment, two ring-shaped phosphor bodies of different concentric shapes, i.e., an outer ring-shaped light-emitting region and an inner ring-shaped light-emitting region, are formed on phosphor wheel 7. In addition, the spot diameter of the excitation light of the first wavelength that is irradiated upon the phosphor wheel is similar to the related art, but the sizes of the outer ring-shaped light-emitting region and the inner ring-shaped light-emitting region are set such that the excitation light simultaneously irradiates the outer ring-shaped light-emitting region and the inner ring-shaped light-emitting region. As a result, excitation light of the first wavelength simultaneously irradiates the outer ring-shaped light-emitting region and the inner ring-shaped light-emitting region. Accordingly, the light emission area in the outer ring-shaped light-emitting region and the light emission area in the inner ring-shaped light-emitting region are each smaller than for a case in which illumination light of the same wavelength is generated by one spot of the excitation light. As a result, the etendue of illumination light that is emitted by the phosphor wheel is smaller than in the related art. In addition, even though the smaller light emission area results in a decreased amount of light emission, in contrast to the related art, the formation of the light-emitting regions in a ring shape enables longer emission time and an increase in the total amount of illumination light.

Still further, this configuration allows the illumination light of the second wavelength that is emitted in phosphor region 10 to be spatially divided from the illumination light of the third wavelength and illumination light of the fourth wavelength that are emitted in phosphor regions 11 and 12. Accordingly, the illumination light of the second wavelength can be irradiated into a different light tunnel 15 or 16 than the illumination light of the third wavelength and the illumination light of the fourth wavelength. As a result, the aperture areas of light tunnels 15 and 16 can be made smaller than for a case in which illumination light of all wavelengths is irradiated into a single light tunnel. When light tunnels 15 and 16 are assumed to be the light source of illumination light that is emitted from light source apparatus 20, the etendue can be decreased compared to a light source apparatus of the related art that has a single light-guiding device (light tunnel). As a result, the utilization efficiency of light can be improved, and moreover, a high-luminance light source apparatus can be realized without entailing an increase in the size of the device.

In addition, a configuration can be adopted in which three ring-shaped light-emitting regions that respectively emit illumination light of second to fourth wavelengths can be formed on a phosphor wheel and the light then irradiated into three light tunnels.

Second Exemplary Embodiment

The second exemplary embodiment of the light source apparatus according to the present invention is next described. Explanation of constructions that are the same as the first exemplary embodiment is here omitted.

Figure 7:
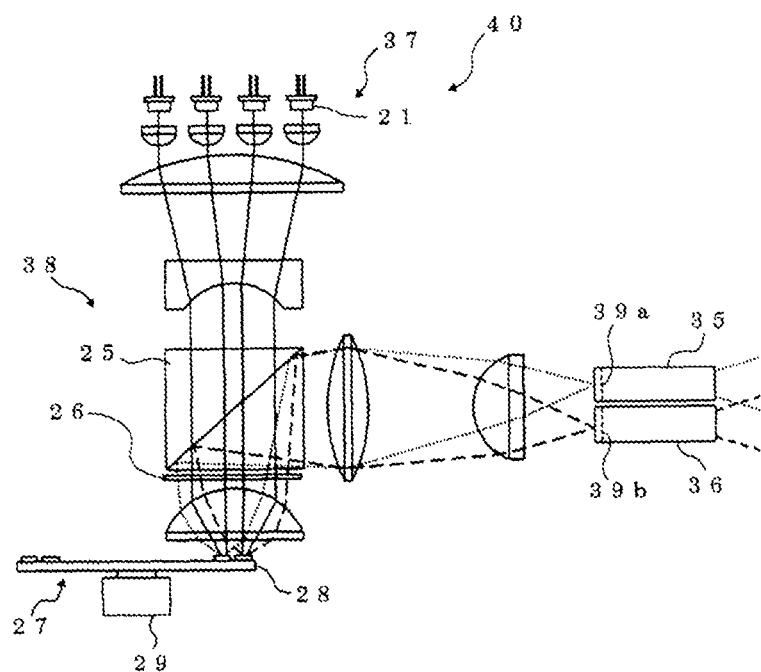
FIG. 7 is a schematic block diagram of a light source apparatus of the second exemplary embodiment of the light source apparatus according to the present invention.

FIG. 7 is a schematic block diagram of the second exemplary embodiment of the light source apparatus according to the present invention. In the present exemplary embodiment, light source 21 is assumed to be a blue laser diode. In other words, excitation light that is emitted from light source 21 is of the fourth wavelength, this wavelength being 448 nm. The polarization direction of the laser diode at this time is assumed to be S-polarized light (first polarization).

In the present exemplary embodiment, the configuration of light source unit 37 is the same as in the first exemplary embodiment with the exception of the use of an S-polarization blue laser diode as light source 21.

Excitation Optical System

In excitation optical system 38 of the present exemplary embodiment, quarter-wave plate 26 is arranged between dichroic prism 25 and phosphor wheel 27.

Phosphor Wheel

Figure 8:
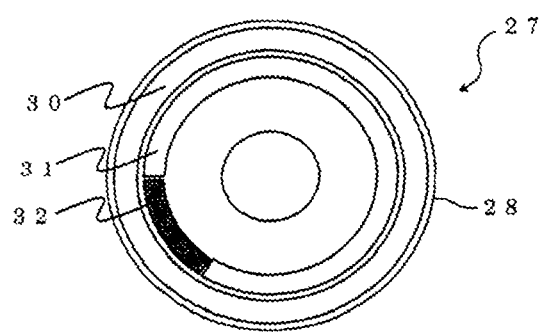
FIG. 8 is a view as seen from the side of irradiation of excitation light to the phosphor wheel in the second exemplary embodiment.
Figure 9:
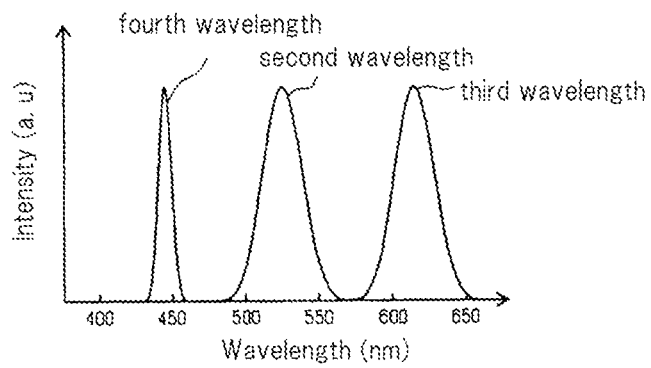
FIG. 9 is a graph showing the intensity of light from the second wavelength to the fourth wavelength in the second exemplary embodiment.

FIG. 8 is a view from the side of the irradiation of excitation light to phosphor wheel 27 in the present exemplary embodiment. FIG. 9 is a graph showing the intensity of light of the second wavelength to the fourth wavelength in the present exemplary embodiment. Ring-shaped phosphor region 30 (corresponding to the "outer ring-shaped light-emitting region" of the first exemplary embodiment) and a ring-shaped region (corresponding to the "inner ring-shaped light-emitting region" of the first exemplary embodiment) that is on the inner side of phosphor region 30 and that is composed of phosphor region 31 and diffusion-reflection region 32 are provided on substrate 28. When light of the fourth wavelength that is the excitation light from light source 21 is irradiated, phosphor region 30 and phosphor region 31 respectively emit illumination light of the second wavelength and illumination light of the third wavelength. Diffusion-reflection region 32 both spreads the angle of diffusion of excitation light of the fourth wavelength that is irradiated and reflects the light in the direction of the optical axis. In the present exemplary embodiment, the second wavelength is green, and the third wavelength is red.

Dichroic Prism

Figure 10:
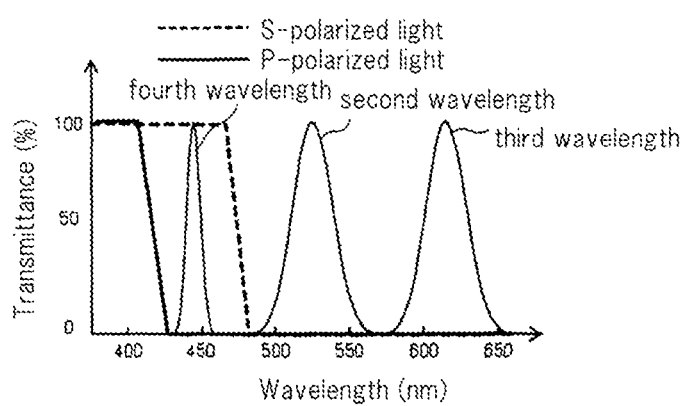
FIG. 10 is a graph showing the optical characteristics of a dichroic prism in the second exemplary embodiment.

FIG. 10 is a graph showing the optical characteristics of dichroic prism 25. As shown in FIG. 10, dichroic prism 25 functions as a polarized beam splitter (PBS) in the blue wavelength region (fourth wavelength region). More specifically, dichroic prism 25 transmits S-polarized light and reflects P-polarized light.

The transition of blue light (excitation light of the fourth wavelength) is here described. As explained hereinabove, excitation light of the fourth wavelength is blue S-polarized light and is therefore transmitted by dichroic prism 25 and transmitted by quarter-wave plate 26 to be converted to circularly polarized light. After being reflected at diffusion-reflection region 32 of phosphor wheel 27, the light is again transmitted through quarter-wave plate 26 and therefore has the same optical conditions as the excitation light of the fourth wavelength that was reflected at diffusion-reflection region 32 and transmitted through the half-wave plate, its polarization axis being rotated 90 degrees to be converted to P-polarized light (the second polarization). Accordingly, blue light that is the excitation light of the fourth wavelength that was reflected at diffusion-reflection region 32 is reflected by dichroic prism 25 and separated from excitation light that is directed from light source 21 to phosphor wheel 27. The polarization of the excitation light of the fourth wavelength and the optical characteristics of dichroic prism 25 are not particularly limited and are open to modifications within a range in which similar effects are obtained.

Light Tunnel

Figure 11A:
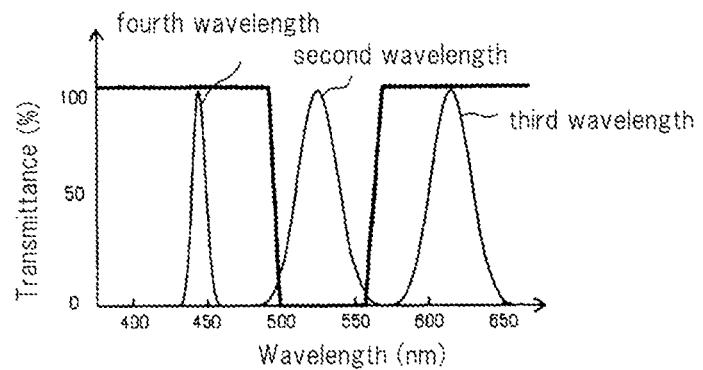
FIG. 11A is a graph showing the transmittance characteristics of the color filter that is arranged at the irradiation port or emission port of the first light tunnel in the second exemplary embodiment.
Figure 11B:
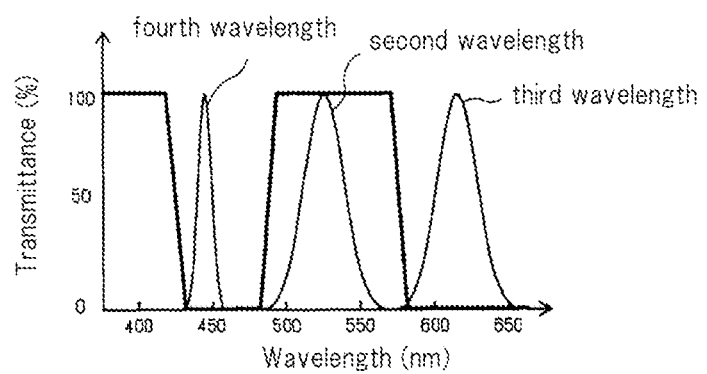
FIG. 11B is a graph showing the transmittance characteristics of the color filter that is arranged at the irradiation port or emission port of the second light tunnel in the second exemplary embodiment.

FIG. 11A is a graph showing the transmittance characteristics of color filter 39a that is arranged at the irradiation port or emission port of first light tunnel 35. FIG. 11B is a graph showing the transmittance characteristics of color filter 39b that is arranged at the irradiation port or emission port of second light tunnel 36.

In the present exemplary embodiment, only green illumination light that is of the second wavelength is irradiated into first light tunnel 35, and blue illumination light and red illumination light of the first and third wavelengths are irradiated into second light tunnel 36 in time divisions according to the position of the spot of the excitation light.

Color filter 39a that is arranged at first light tunnel 35 transmits light of the second wavelength (green) without transmitting light of the fourth wavelength (blue) and light of the third wavelength (red).

Color filter 39b is arranged at second light tunnel 36 and transmits light of the fourth wavelength (blue) and light of the third wavelength (red) without transmitting light of the second wavelength (green).

By means of the above-described configuration, illumination light of the second wavelength can be irradiated into light tunnel 35 or 36 and illuminated light of the third wavelength and illumination light of the fourth wavelength can be irradiated into un-irradiated light tunnel 35 or 36, as in the first exemplary embodiment. As a result, the aperture areas of light tunnels 35 and 36 can be made smaller. Accordingly, when light tunnels 35 and 36 are assumed to be the light sources of illumination light that is emitted from light source apparatus 40, the etendue can be decreased compared to a light source apparatus of the related art. As a result, the light utilization efficiency can be improved, and moreover, a high-luminance light source apparatus can be realized without entailing an increase in the size of the device.

Third Exemplary Embodiment

In the above-described exemplary embodiments, excitation light that excites phosphors irradiates an outer ring-shaped light-emitting region and an inner ring-shaped light-emitting region as a single spot. However, the spot of excitation light that excites the phosphors preferably irradiates the outer ring-shaped light-emitting region and inner ring-shaped light-emitting region in a spatially separated state. This is because, when the outer and inner ring-shaped light-emitting regions are excited by the same excitation light spot, the excitation light irradiates the phosphor wheel with the region (border portion) between the outer ring-shaped light-emitting region and the inner ring-shaped light-emitting region as the center. As previously explained, the phosphor wheel and irradiation ports of the light tunnels are in positions having a conjugate relation. As a result, the light from the outer ring-shaped light-emitting region and the inner ring-shaped light-emitting region irradiates the first light tunnel or second light tunnel in a spatially separated state at the irradiation ports of the first light tunnel or second light tunnel. However, light from the border portion is unable to pass through the irradiation port of either light tunnel. In order to increase the amount of light irradiated into the irradiation port of the light tunnels to improve the light utilization efficiency, a configuration is preferable in which excitation light is irradiated into only the outer ring-shaped light-emitting region and the inner ring-shaped light-emitting region.

In a configuration in which the same optical parts are used to guide the excitation light from a plurality of laser diodes that are the light sources to a phosphor wheel, the division of the excitation light into two spots on the phosphors can be realized by dividing a plurality of laser diodes arranged in array form into two groups and spatially arranging these groups at intervals.

However, completely separating the spot of the excitation light into two spots on a phosphor wheel requires adequate spacing between the laser diode group for irradiating the outer ring-shaped light-emitting region and the laser diode group for irradiating the inner ring-shaped light-emitting region. As a result, the optical parts used in the excitation optical system are made larger, the size of the entire device is increased, and the cost increases.

As a method of obtaining adequate spacing between the separated excitation light spots without increasing the size of the excitation optical system in the present exemplary embodiment to solve the above-described problem, the central axis of a collimator lens is decentered in the direction of the diameter of the collimator lens with respect to the light-emission point of the laser diode.

Figure 12A:
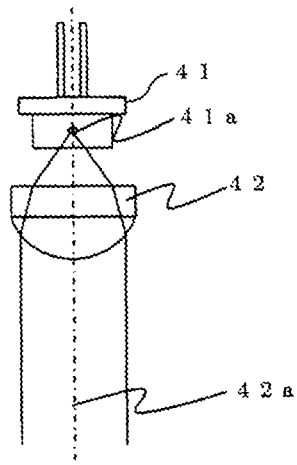
FIG. 12A is a schematic view for describing the behavior of excitation light when the light-emission point of a laser diode that is the light source coincides with the central axis of the collimator lens.
Figure 12B:
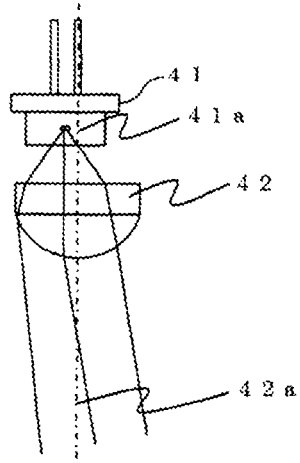
FIG. 12B is a schematic view for describing the behavior of excitation light when the light-emission point of a laser diode that is the light source is decentered from the central axis of the collimator lens.

FIG. 12A is a schematic view for describing the behavior of excitation light when light-emission point 41a of the LD that is light source 41 coincides with central axis 42a of collimator lens 42. FIG. 12B is a schematic view for describing the behavior of excitation light when light-emission point 41a of the LD that is light source 41 is decentered from central axis 42a of collimator lens 42.

When light-emission point 41a of the laser diode that is light source 41 coincides with central axis 42a of collimator lens 42, the divergent beam that is emitted from the laser diode is converted to a parallel beam by collimator lens 42. On the other hand, when light-emission point 41a of the laser diode that is light source 41 is decentered from central axis 42a of collimator lens 42, the divergent beam that is emitted from the laser diode is converted to a parallel beam by collimator lens 42, but this parallel beam deviates in the direction opposite to light-emission point 41a of the laser diode with respect to central axis 42a of collimator lens 42.

Figure 13:
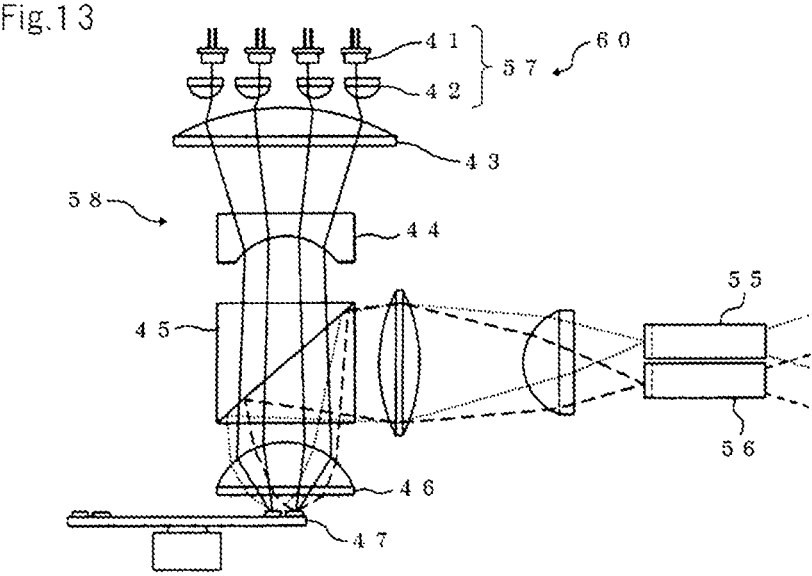
FIG. 13 is a schematic block diagram of the light source apparatus of the third exemplary embodiment of the light source apparatus according to the present invention.

The light source apparatus of the present exemplary embodiment is next described based on the above-described content. FIG. 13 is a schematic block diagram of the light source apparatus of the third exemplary embodiment of the light source apparatus according to the present invention. Explanation regarding constructions that are the same as in the first exemplary embodiment will be omitted.

Light Source Unit

Light source unit 57 includes: a plurality of laser diodes that are light sources 41 and that emit light of the first wavelength, and collimator lenses 42. Because the light emitted from a laser diode is a divergent beam, collimator lenses 42 are arranged opposite each laser diode to convert the light to a parallel beam. As described using FIG. 12B, excitation light that has been converted to a parallel beam is separated into two traveling directions by causing the central axis of collimator lens 42 to deviate from the light-emission point of the laser diode. More specifically, the laser diodes that are light source 41 are arranged at equal spacing, and the light-emission points of a portion of these laser diodes deviate in a first direction toward the right in FIG. 13 with respect to the central axis of each opposing collimator lens 42, and the light-emission points of the remaining laser diodes deviate in a second direction toward the left in FIG. 13 with respect to the central axis of each opposing collimator lens 42. Here, the excitation light that is emitted from the laser diodes corresponding to collimator lenses 42 that are decentered toward the right is converted by collimator lenses 42 to parallel beams that deviate toward the right in FIG. 13. On the other hand, excitation light that is emitted from laser diodes corresponding to collimator lenses 42 that are decentered toward the left is converted by collimator lenses 42 to parallel beams that deviate toward the left in FIG. 13.

Excitation Optical System

Excitation optical system 58 is next described. Excitation optical system 58 is made up of convex lens 43, concave lens 44, dichroic prism 45, and lens 46 and forms a spot of excitation light on phosphor wheel 47. However, excitation optical system 58 is not limited to the above-described optical components. For example, diffusers or other lenses may be arranged before, after, or between the above-described optical components to realize an appropriate excitation light spot. Excitation optical system 58 condenses excitation light that is emitted from light source unit 57 on phosphor wheel 47 by means of the above-described optical components. In the present exemplary embodiment, the excitation light emitted from light source unit 57 is separated into two directions of travel, and the excitation light after passing through excitation optical system 58 is therefore separated into two spots on phosphor wheel 47.

In light source apparatus 60 of the present exemplary embodiment, different excitation light beams are irradiated onto two ring-shaped light-emitting regions on phosphor wheel 47 by a simple configuration. In addition, by arranging two light tunnels 55 and 56 at positions (positions in a conjugate relation) at which only light emitted from each ring-shaped light-emitting region is irradiated, light of independent wavelengths can be obtained from each of light tunnels 55 and 56.

Figure 14A:
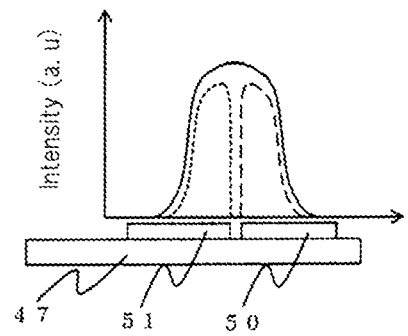
FIG. 14A is the light intensity distribution of light that is emitted by phosphors and excitation light on the phosphor wheel when the excitation light from the light source is not separated.
Figure 14B:
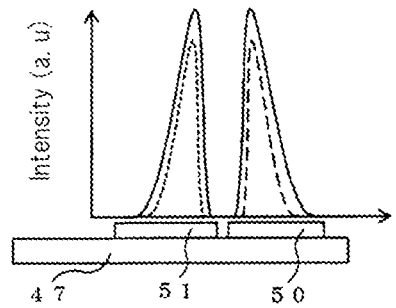
FIG. 14B is the intensity distribution of light that is emitted by phosphors and excitation light on the phosphor wheel when excitation light from the light source is separated.

The effects of the present exemplary embodiment are next described more concretely. FIG. 14A is the intensity distribution of excitation light on a phosphor wheel when the excitation light from the light source is not separated, and FIG. 14B is the intensity distribution of excitation light on a phosphor wheel when the excitation light from the light source has been separated. The solid line shows the intensity distribution of excitation light that is irradiated upon a phosphor wheel, the dotted line shows the intensity distribution of light that is emitted in inner ring-shaped light-emitting region 51, and the broken line shows the intensity distribution of light emitted in outer ring-shaped light-emitting region 50. In addition, the horizontal axis in FIGS. 14A and 14B shows the position on phosphor wheel 47.

Figure 15A:
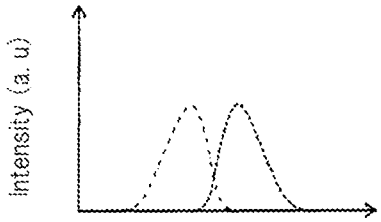
FIG. 15A is the intensity distribution of illumination light on each light tunnel when the excitation light from the light source is not separated.
Figure 15B:
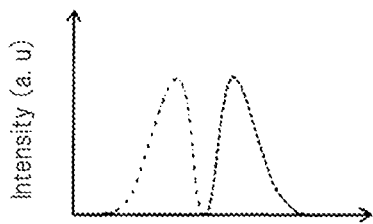
FIG. 15B is the intensity distribution of illumination light on each light tunnel when the excitation light from the light source is separated.

FIG. 15A is a graph showing the relation between the wavelength and intensity of light that is irradiated into each light tunnel when the excitation light from the light source is not separated, and FIG. 15B is a graph showing the relation between the wavelength and intensity of light irradiated into each light tunnel when the excitation light from the light source is separated. In FIGS. 15A and 15B, the broken line represents the intensity distribution of light irradiated into one light tunnel, and the dotted line represents the intensity distribution of light irradiated into the other light tunnel.

When a single excitation light spot excites two ring-shaped light-emitting regions 50 and 51, the center of the spot of excitation light is at a position (border region) between the two ring-shaped light-emitting regions 50 and 51, and the intensity of the excitation light is assumed to be highest at the center of the spot of excitation light and to decrease with increasing distance from the center.

Because the light emission intensity distribution of a phosphor depends on the intensity distribution of the excitation light, the light emission intensity of a phosphor is at the maximum value in the vicinity of the border region. In addition, when there are areas in which phosphor has not been applied in the border region of a phosphor ring due to the conditions of the fabrication processes, i.e., when there is a gap between outer ring-shaped light-emitting region 50 and inner ring-shaped light-emitting region 51, a portion of the excitation light does not contribute to excitation of the phosphor, and the light utilization efficiency therefore drops.

On the other hand, in the case of a configuration in which two excitation light spots are formed, the excitation light is irradiated onto the phosphor such that the maximum value of the light emission intensity distribution is present within ranges of each of ring-shaped light-emitting regions 50 and 51, and the intensity distribution of light emitted in the phosphor therefore has a form that also has the maximum value within ring-shaped light-emitting regions 50 and 51. In addition, even if a region in which phosphor has not been applied should exist in the border portion of ring-shaped light-emitting regions 50 and 51, no loss occurs because the excitation light is irradiated only into ring-shaped light-emitting regions 50 and 51.

The intensity distribution of fluorescent light on a light tunnel is next described. The positions of the phosphor wheel and light tunnel irradiation port are in a conjugate relation. If an ideal image formation can be realized in the optical system from the phosphor wheel to the light tunnel, then the intensity distribution of light emitted in a ring-shaped light-emitting region will be completely reproduced at the irradiation port of the light tunnel. In an actual optical system, however, the intensity distribution of light spreads at the irradiation port of the light tunnel due to the occurrence of aberration. Accordingly, when two ring-shaped light-emitting regions are excited by one excitation light spot, a region occurs in the light tunnel in which light from each ring-shaped light-emitting region is color-mixed (refer to FIG. 15A).

As described in the above-described exemplary embodiment, a color filter that selectively transmits wavelengths of the light that is emitted from the light tunnel is arranged at the light tunnel, and light of the region of color-mixing is therefore eliminated by the color filter. Accordingly, the light utilization efficiency drops. On the other hand, in the case of a configuration that forms two excitation spots, the region of color-mixing in the two light tunnels can be minimized, and elimination of the color-mixed component by a color filter is therefore a minimum. As a result, the light utilization efficiency is improved.

In the case of the configuration of the present exemplary embodiment, the excitation light forms separate spots in the outer light-emitting region and inner light-emitting region. As a result, the light emission area of illumination light in the outer light-emitting region and the light emission area of illumination light in the inner light-emitting region are each smaller than in the configuration of the related art, as in the above-described embodiments. As a result, the etendue of illumination light that is emitted from a phosphor wheel is reduced. In addition, the aperture area of the light tunnels is also smaller, and the etendue of illumination light emitted from the light source apparatus is therefore smaller.

A projection display apparatus that is equipped with the light source apparatus of the present invention is next described.

First Exemplary Embodiment

Figure 16:
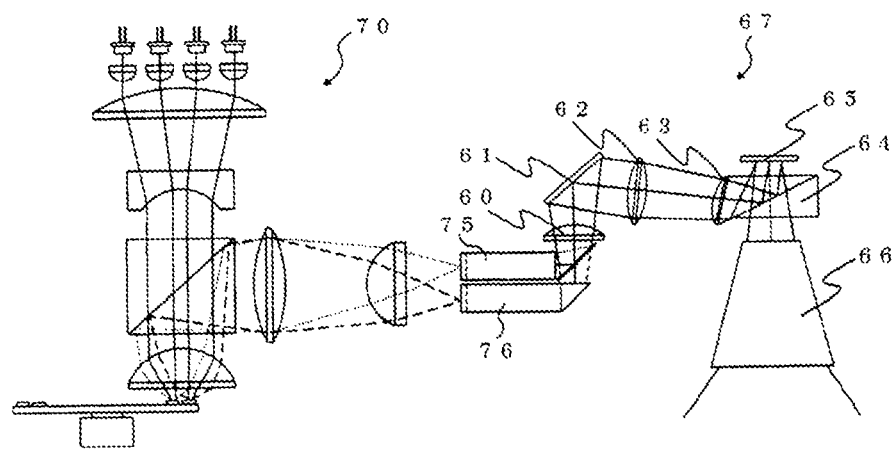
FIG. 16 is a schematic block diagram of the first exemplary embodiment of the projection display apparatus according to the present invention.

FIG. 16 is a schematic block diagram of the first exemplary embodiment of the projection display apparatus according to the present invention. The projection display apparatus in the present exemplary embodiment is described based on FIG. 16. The configuration of the light source apparatus is the same as the light source apparatus of the first exemplary embodiment, and explanation is therefore here omitted. In addition, the optical axis of light that is emitted from one of light tunnels 75 and 76 corresponds to the optical axis of light emitted from the other, as described in the first exemplary embodiment.

As shown in FIG. 16, the angle of diffusion of light that is emitted from each of light tunnels 75 and 76 of light source apparatus 70 is blocked by convex lens 60, following which the light is reflected by mirror 61. The light that is reflected by mirror 61 passes through field lens 62, condensed by convex lens 63, and irradiated into TIR (Total Internal Reflection) prism 64. The light that is irradiated into TIR prism 64 undergoes total reflection toward a DMD (Digital Micromirror Device) 65 that is a light modulation element, and is then modulated in DMD 65 to become image light. The image light that is emitted from DMD 65 passes through TIR prism 64. The image light that has passed through TIR prism 64 is then enlarged and projected onto a screen by projection lens 66.

Image light in which red, blue, and green from light source apparatus 70 are time-divided can be obtained by, based on image information, adjusting the timing of the light emission of each laser diode of the light source of light source apparatus 70, the phase of the phosphor wheel, and the modulated signal to DMD 65.

In addition, due to the small etendue of light that is emitted from light source apparatus 70, the utilization efficiency of light in projection display apparatus 67 of the present invention can be raised. As a result, a high-luminance projection display apparatus can be realized.

Second Exemplary Embodiment

Figure 17:
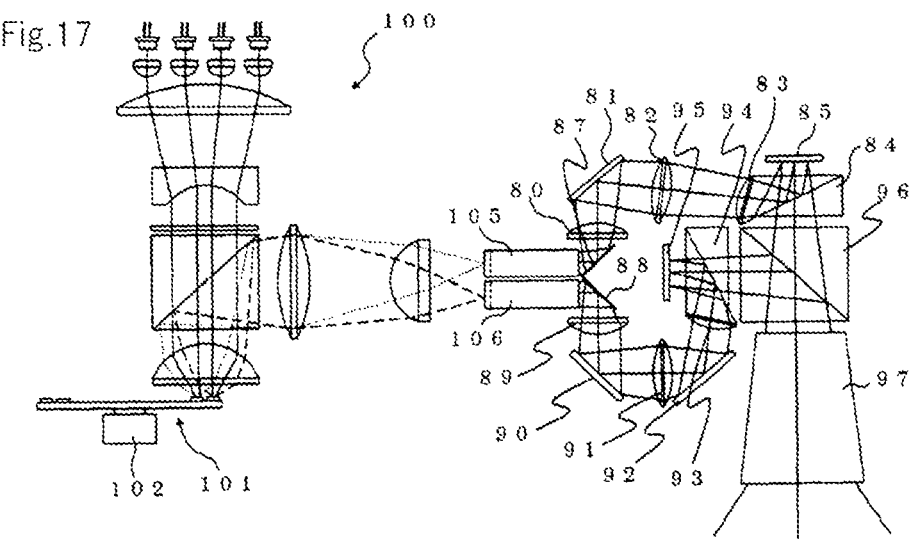
FIG. 17 is a schematic block diagram of the second exemplary embodiment of the projection display apparatus according to the present invention.

FIG. 17 is a schematic block diagram of the second exemplary embodiment of the projection display apparatus according to the present invention. The projection display apparatus in the present exemplary embodiment is described based on FIG. 17. The configuration of light source apparatus 100 is the same as that of the light source apparatus of the first exemplary embodiment, and explanation is therefore here omitted.

As shown in FIG. 17, light that is emitted from first light tunnel 105 is reflected by mirror 87, the angle of diffusion then limited by convex lens 80, and the light then reflected by mirror 81. The light reflected by mirror 81 passes by way of field lens 82, is condensed by convex lens 83, and is then irradiated into first TIR prism 84. The light that is irradiated into first TIR prism 84 undergoes total reflection toward first DMD 85 and is modulated in first DMD 85 to become image light. The image light emitted from first DMD 85 then passes through first TIR prism 84.

Light that is emitted from second light tunnel 106 is reflected by mirror 88, the angle of diffusion of the light is limited by convex lens 89, following which the light is reflected by mirror 90, passes by way of field lens 91, and is then reflected by mirror 92. The light reflected by mirror 92 is condensed by convex lens 93 and then irradiated into second TIR prism 94. The light that is irradiated into second TIR prism 94 undergoes total reflection toward second DMD 95 and is then modulated by second DMD 95 to become image light. The image light emitted from second DMD 95 is then transmitted through second TIR prism 94.

The image light that is transmitted through first TIR prism 84 and the image light that is transmitted through second TIR prism 94 are combined on the same optical axis in dichroic prism 96 (image synthesizing unit) and then enlarged and projected onto a screen by projection lens 97. The method of synthesizing the image light is not limited to a dichroic prism, and for example, may also be realized by using a dichroic mirror and a mirror to reflect one of the image light beams by the dichroic mirror and transmit the other image light beam that was reflected by the mirror.

The operation of the present exemplary embodiment is next described. First DMD 85, to which light is guided from first light tunnel 105 that emits the light that was emitted from the outer ring-shaped light-emitting region that emits light of the second wavelength, constantly modulates light based on the image information of light of the second wavelength. Light of the third wavelength or light of the fourth wavelength that was emitted in the inner ring-shaped light-emitting regions according to the phase (angle of rotation) of the rotation motor of phosphor wheel 101 is irradiated into second DMD 95, to which light is guided from second light tunnel 106. Second DMD 95 modulates light in time divisions based on the image information of the irradiated wavelength in synchronization with the phase of rotation motor 9. Accordingly, an interval in which one frame is displayed is made up of the time in which light of the second wavelength and light of the third wavelength are projected and the time that light of the second wavelength and light of the fourth wavelength are projected.

Although a DMD was presented as the light modulation element in the projection display apparatus of the present invention, the present invention is not limited to this form. The present invention may employ a configuration that uses a liquid crystal element as the light modulation element.

The light source apparatus of the second or third exemplary embodiments can obviously also be used in the projection display apparatus of the present invention.

Although preferable exemplary embodiments of the present invention have been presented and described in detail hereinabove, it should be understood that the present invention is not limited to the above-described exemplary embodiments and is open to various modifications and amendments that do not depart from the gist of the invention.

EXPLANATION OF REFERENCE NUMBERS 1, 21, 41 light source (solid-state light source)
2, 42, collimator lens
5, 25, 45 dichroic prism
7, 27, 47, 101 phosphor wheel
10, 11, 12, 30, 31, 32 phosphor region
15, 35, 55, 75, 105 first light tunnel (optical element)

16, 36, 56, 76, 106 second light tunnel (optical element)
17, 21, 41 light source unit
19a, 19b, 39a, 39b color filter
20, 37, 60, 70, 100 light source apparatus
23 synthesizing unit
26 quarter-wave plate
33 diffusion-reflection region
41a light-emission point
42c center line
50 first ring-shaped light-emitting region
51 second ring-shaped light-emitting region
64 TIR prism
65 DMD (light-modulating element)
84 first TIR prism
85 first DMD (first light-modulating element)
94 second TIR prism
95 second DMD (second light-modulating element)
96 dichroic prism (image light synthesizing unit)

What is claimed is:

1. A light source apparatus comprising:
a phosphor wheel provided with a plurality of ring-shaped light-emitting regions that are arranged concentrically and that emit illumination light beams of a plurality of colors due to irradiation with excitation light;
a light source unit that emits said excitation light simultaneously to said plurality of ring-shaped light-emitting regions; and
a plurality of optical elements into which are irradiated said plurality of illumination light beams that are emitted due to the irradiation of said excitation light; wherein:
said light source unit radiates excitation light of a fourth wavelength and of a first polarization;
said plurality of ring-shaped light-emitting regions include: a first ring-shaped light-emitting region including a phosphor region that emits illumination light of a second wavelength by being irradiated with said excitation light; and a second ring-shaped light-emitting region including a phosphor region that emits illumination light of a third wavelength by being irradiated with said excitation light and a diffusion-reflection region that diffuses and reflects illumination light of the fourth wavelength by being irradiated with said excitation light;
said plurality of optical elements include: a first optical element into which illumination light of said second wavelength is irradiated, and a second optical element into which illumination light of said third wavelength and illumination light of said fourth wavelength are irradiated;
a wave plate that transmits said excitation light and a plurality of illumination light beams from said phosphor wheel is provided between said light source unit and said phosphor wheel; and
a dichroic prism is provided on a light path between said light source unit and said wave plate that transmits said excitation light from said light source unit, reflects illumination light of said second wavelength that is transmitted by said wave plate toward said first optical element, and reflects illumination light of said third wavelength and illumination light of said fourth wavelength that are transmitted by said wave plate toward said second optical element.

2. The light source apparatus as set forth in claim 1, wherein:
said light source unit includes a plurality of solid-state light sources that emit excitation light, and collimator lenses arranged to face each of said solid-state light sources; and
the light-emission point of each of said solid-state light sources is decentered from the central axis of said collimator lens.

3. The light source apparatus as set forth in claim 1, wherein:
a color filter that selectively transmits illumination light of a specific wavelength is provided for each of said plurality of optical elements.

4. The light source apparatus as set forth in claim 1, wherein:
said wave plate comprises a quarter-wave plate.

5. A projection display apparatus provided with the light source apparatus as set forth in claim 1, comprising:
a synthesizing unit that radiates illumination light emitted from said plurality of optical elements on the same optical axis;
a light modulation element that modulates said illumination light from said synthesizing unit to reflect image light; and
a projection lens that enlarges and projects said image light.

6. A projection display apparatus provided with the light source apparatus as set forth in claim 1, comprising:
a plurality of light modulation elements provided corresponding to said plurality of optical elements that modulate illumination light emitted from said plurality of optical elements to reflect image light;
an image synthesizing unit that synthesizes and emits image light irradiated from said plurality of light modulation elements; and
a projection lens that enlarges and projects said synthesized image light from said image synthesizing unit.

7. A method of emitting illumination light, comprising:
simultaneously irradiating excitation light to a plurality of ring-shaped light-emitting regions that are provided and arranged concentrically on a phosphor wheel;
irradiating any of a plurality of optical elements with a plurality of illumination light beams produced by irradiation with said excitation light;
making an intensity of said plurality of illumination light beams, that were irradiated to said plurality of optical elements, uniform and emitting said plurality of illumination light beams; wherein:
a light source unit radiates excitation light of a fourth wavelength and of a first polarization;
said plurality of ring-shaped light-emitting regions include: a first ring-shaped light-emitting region including a phosphor region that emits illumination light of a second wavelength by being irradiated with said excitation light; and a second ring-shaped light-emitting region including a phosphor region that emits illumination light of a third wavelength by being irradiated with said excitation light and a diffusion-reflection region that diffuses and reflects illumination light of the fourth wavelength by being irradiated with said excitation light;
said plurality of optical elements include: a first optical element into which illumination light of said second wavelength is irradiated, and a second optical element into which illumination light of said third wavelength and illumination light of said fourth wavelength are irradiated;

a wave plate that transmits said excitation light and a plurality of illumination light beams from said phosphor wheel is provided between said light source unit and said phosphor wheel; and a dichroic prism is provided on a light path between said light source unit and said wave plate that transmits said excitation light from said light source unit, reflects illumination light of said second wavelength that is transmitted by said wave plate toward said first optical element, and reflects illumination light of said third wavelength and illumination light of said fourth wavelength that are transmitted by said wave plate toward said second optical element.

* * * * *